United States Patent
Ho et al.

(10) Patent No.: US 9,027,054 B2
(45) Date of Patent: May 5, 2015

(54) METHOD AND SYSTEM TO PROCESS TELEVISION PROGRAM SUMMARY

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 673 days.

(21) Appl. No.: 11/880,991

(22) Filed: Jul. 25, 2007

(65) Prior Publication Data

US 2009/0031352 A1 Jan. 29, 2009

(51) Int. Cl.
*H04N 5/445* (2011.01)
*H04N 21/431* (2011.01)
*H04N 21/482* (2011.01)

(52) U.S. Cl.
CPC ....... *H04N 5/44543* (2013.01); *H04N 21/4316* (2013.01); *H04N 21/482* (2013.01)

(58) Field of Classification Search
USPC ........................................ 725/37–45
See application file for complete search history.

(56) References Cited

U.S. PATENT DOCUMENTS

| | | | | |
|---|---|---|---|---|
| 5,589,892 A * | 12/1996 | Knee et al. | ....... | 725/43 |
| 6,002,394 A * | 12/1999 | Schein et al. | ....... | 725/39 |
| 6,144,376 A * | 11/2000 | Connelly | ....... | 725/44 |
| 6,177,931 B1 * | 1/2001 | Alexander et al. | ....... | 725/52 |
| 6,452,609 B1 * | 9/2002 | Katinsky et al. | ....... | 715/716 |
| 7,458,093 B2 * | 11/2008 | Dukes et al. | ....... | 725/141 |
| 2001/0004769 A1 * | 6/2001 | Simon | ....... | 725/108 |
| 2002/0104099 A1 * | 8/2002 | Novak | ....... | 725/136 |
| 2002/0135698 A1 * | 9/2002 | Shinohara | ....... | 348/473 |
| 2003/0088872 A1 * | 5/2003 | Maissel et al. | ....... | 725/46 |
| 2003/0093807 A1 * | 5/2003 | Nguyen | ....... | 725/109 |
| 2004/0123317 A1 * | 6/2004 | Ozawa | ....... | 725/39 |
| 2005/0022237 A1 * | 1/2005 | Nomura | ....... | 725/39 |
| 2006/0064721 A1 * | 3/2006 | Del Val et al. | ....... | 725/41 |
| 2006/0174269 A1 * | 8/2006 | Hansen-Turton | ....... | 725/39 |
| 2006/0174271 A1 * | 8/2006 | Chen et al. | ....... | 725/39 |
| 2007/0050817 A1 | 3/2007 | Lee | | |
| 2008/0066092 A1 * | 3/2008 | Laude et al. | ....... | 725/20 |
| 2009/0046987 A1 * | 2/2009 | White et al. | ....... | 386/83 |

OTHER PUBLICATIONS

"WADL TV Channel 38 Mt. Clemens/Detroit", Jul. 2009.
"Virtual channel", Wikipedia, Jun. 28, 2007.

* cited by examiner

*Primary Examiner* — Dominic D Saltarelli
(74) *Attorney, Agent, or Firm* — North Shore Patents, P.C.; Michele Liu Baillie

(57) ABSTRACT

Provided is a method and system for displaying video streams, including receiving video data from a plurality of video stream by a frame controller in communication with a television display including a first picture and a second picture, and also receiving a television program summary list. The television program summary list includes television program data corresponding to the received video streams, and displaying the television program summary list in the second picture, and allowing the selection of a program from the television program summary list by a consumer, and displaying the selected video stream in the first picture.

28 Claims, 4 Drawing Sheets

METHOD AND SYSTEM TO PROCESS TELEVISION PROGRAM SUMMARY

FIELD OF THE INVENTION

This invention generally relates to media, and more particularly, to a method and system to tailor displaying on a television set based on a television program summary.

BACKGROUND OF THE INVENTION

It is commonplace today for cable television and satellite television networks to carry several hundred channels. Typically, even a subscriber to basic services gets over 50 channels. It is not uncommon for a subscriber to have over 100 channels available with a subscription. Advances in Internet video and television make available thousands more channels and videos for consumer entertainment. When a consumer wants to spend an hour watching television, they may have, at their choice, thousands and thousands of television programs available during the hour. Choosing a television program or channel to watch may then become a non-trivial and painful task, defeating the purpose of watching television as an entertaining event.

Many Internet videos and television channels are closely related to television programs shown on regular television channels, yet consumers cannot view a television program and switch to related Internet videos easily on their television set.

For example, in one scenario, Lucy has a television set connected to a cable television network, and an Internet television set-top box allowing her to watch televised video on the Internet. Lucy wants to watch cooking programs, hoping to find a special dish to make for a weekend party. Lucy scans all the cable channels plus at least a hundred Internet television channels before she finds a channel she likes.

In another exemplary scenario, Jack is watching live televised Olympics events on television. Jack learns that there are at least 100 broadcast and Internet television channels showing Olympic events. These hundred channels publish program schedules of several possible events. Due to the unpredictable timing of an event, the channels do not publish a firm program schedule. The program schedules suggest consumers to check the channels for the actual events covered. After watching a 100 m freestyle swimming heat, Jack wants to watch a bicycle racing event. Jack flips through the hundred channels to find an Internet television channel televising a bicycle race.

Thus, there is a need to tailor display of a television set based on a television program summary and updates.

SUMMARY OF THE INVENTION

An aspect of the present invention provides a television system and method including a frame controller for receiving video data from a video stream. The frame controller is further in communication with a television display. The television display includes a first picture and a second picture, and the video stream is displayed in the first picture. The frame controller further receives a television program summary list and displays it in the second picture. The television program summary list includes television program data for at least one television program.

In one aspect of the invention, the television program data includes a program title, a channel reference, a schedule, and a preview.

In another aspect of the invention, the frame controller allows a consumer to select a television program from the television program summary list.

In one aspect of the invention, the frame controller selects a television program from the television program summary list and displays the selected television program in the first picture.

In one aspect of the invention, the video stream relates to an image and sound signal from a multi-channel operator.

In another aspect of the invention, the video stream relates to an image and sound signal from a multi-service operator.

In another aspect of the invention, the video stream relates to one of an online Internet television portal, a satellite television network, a cable television network, or a broadcast television network.

In another aspect of the invention, the television program data further comprises consumer comments regarding at least one television program.

In another aspect of the invention, the television program summary list includes television program data for a plurality of television programs having a common theme.

In another aspect of the invention, the frame controller further receives a television program summary list update including updated television program data.

In another aspect of the invention, the television program summary list is updated with the updated television program data.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

The term "video data" referred to in the descriptions of various embodiments of the invention herein described is intended to generally describe electronic audio and video signals containing or incorporating video for display on a television or other video display device. This term is used in the broadest sense as known in the electronic arts, and may include analog and/or digital signals. Likewise, the term "video stream" is used in a non-limiting fashion and generally refers to the collection of video data, together with any carrier signals, data headers or other electronic information, which singularly or taken together allow the described embodiments to operate. For example, a digital video stream from a given video source might include multiple packets of compressed video data, each packet or group thereof having one or more packet headers. Typically, one or more of the headers includes information relating to the video data, such as the compression algorithm used, the aspect ratio, etc.

Figure 1:
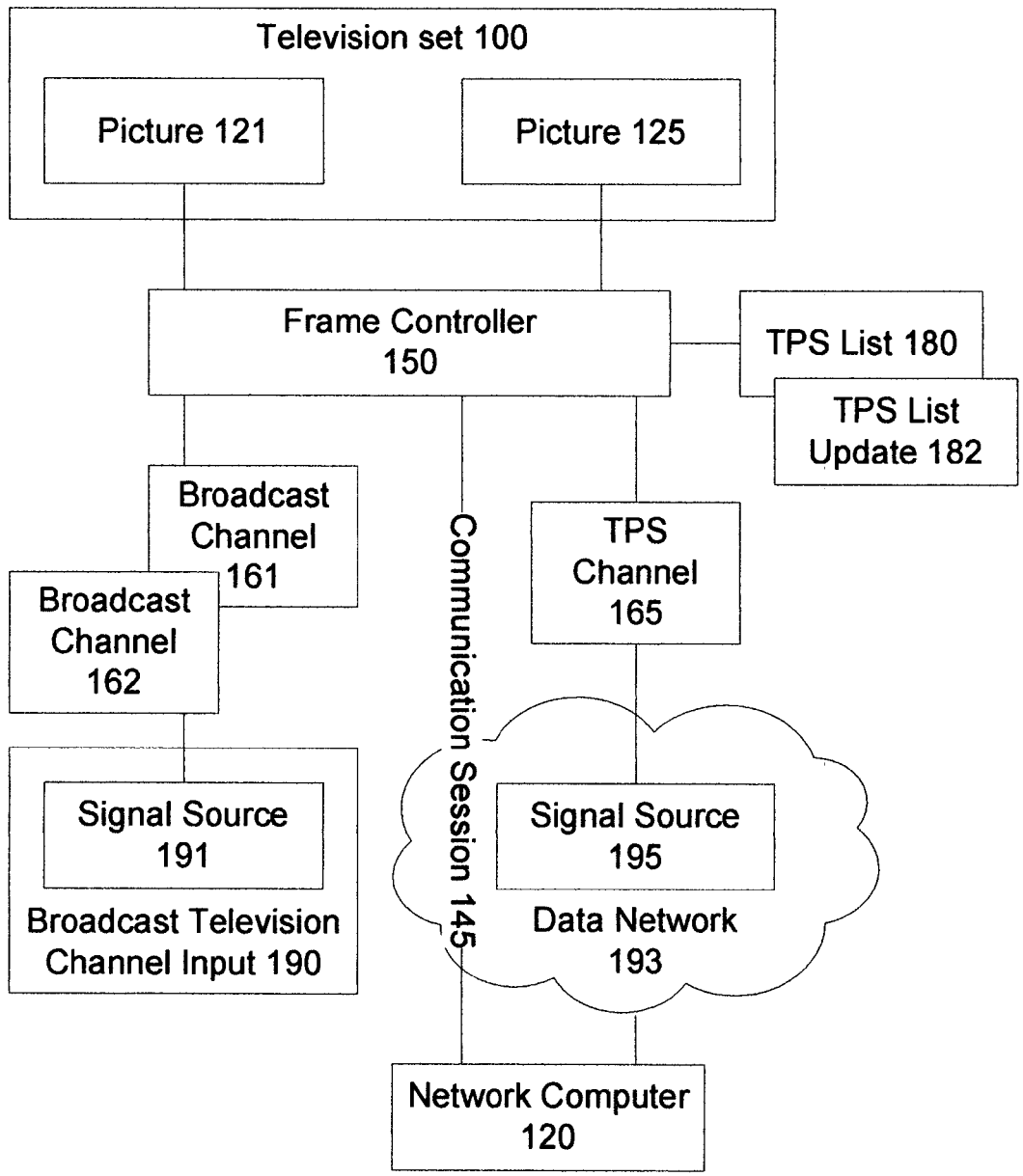
FIG. 1 is a schematic diagram illustrating a television set tuned to a television programming summary channel, in accordance with an embodiment of the present invention.

FIG. 1 illustrates an exemplary television set 100 tuned to a television programming summary channel. In an embodiment of the invention, television set 100 is an electronic device that receives image and sound signals from a plurality of television channels, including a broadcast channel 161 and a television program summary ("TPS") channel 165. Broadcast channel 161 relates to image and sound signal source 191. In one embodiment, signal source 191 is from a broadcast television network, a cable television network, a satellite television network, an online Internet television portal, or any other multi-service or multi-channel operator, while TPS channel 165 relates to image and sound signal source 195, which may be from a web portal or a web site. In various embodiments signal source 195 may be from the Internet, a home network, an enterprise network, or a public network, such as a community network, a WiFi hotspot, a service network of a merchant such as a coffee shop or a restaurant, or other signal source, without limitation.

Also in an embodiment, television set 100 includes picture 121 and picture 125, which are controlled by a frame controller 150, which displays broadcast channel 161 onto picture 121, and Internet channel 165 onto picture 125. The frame controller 150 displays picture 121 and picture 125 simultaneously.

In one embodiment, the frame controller 150 is included in television set 100. In another embodiment, the frame controller 150 connects to television set 100 through an interface. The interface may be an RF interface, a HDMI interface, an S-video interface, a component interface, a composite interface, a network interface, or a wireless network interface such as Wireless Local Area Network (WLAN), Worldwide Interoperability for Microwave Access (WiMax), an Ultra-Wideband (UWB) network, or other suitable interface, without limitation.

In various embodiments of the invention, the frame controller 150 connects to a broadcast television channel input 190, such as an antenna, cable television network, satellite television network, IPTV. The broadcast television channel input 190 includes a signal source 191. The frame controller 150 also connects to a data network 193, which may include a home network, an Ethernet network, a WiFi network, a DSL network, an Intranet network, a hotspot network, a public data network, a cellular data network, or a private data network. Data network 193 includes signal source 195.

In exemplary operation, the frame controller 150 receives a television program summary ("TPS") list 180 from TPS channel 165. The TPS list includes television program data, i.e., information about or concerning the listed television programs. TPS channel 165 may be served by a network computer 120. Frame controller 150 connects to the network computer 120 through a data network 193. In various embodiments, the network computer 120 is a media server, a media center, a web server, a content delivery platform server, or a video server, without limitation.

In an embodiment, frame controller 150 connects to the network computer 120 over a communication session 145, which may be included in TPS channel 165. Communication session 145 may be based on IP or Web technologies. In one scenario wherein communication session 145 is a HTTP session, frame controller 150 sends a HTTP request to the network computer 120, and receives a Web page including TPS list 180, such as an HTML page.

In one embodiment, the frame controller 150 displays TPS list 180 onto picture 125 and further selects broadcast channel 161 based on TPS list 180, and displays broadcast channel 161 onto picture 121.

At a later time, frame controller 150 may receive a TPS list update 182 from TPS channel 165. For example, frame controller 150 sends a HTTP request to network computer 120 and receives a HTML web page including TPS list update 182. TPS list update 182 is an update of TPS list 180, and the frame controller 150 modifies TPS list 180 based on TPS list update 182. Frame controller 150 then displays the modified TPS list 180 onto picture 125. In a further example, frame controller 150 might select broadcast channel 162, different from broadcast channel 161, based on modified TPS list 180. Frame controller 150 then displays broadcast channel 162 onto picture 121.

Figure 2:
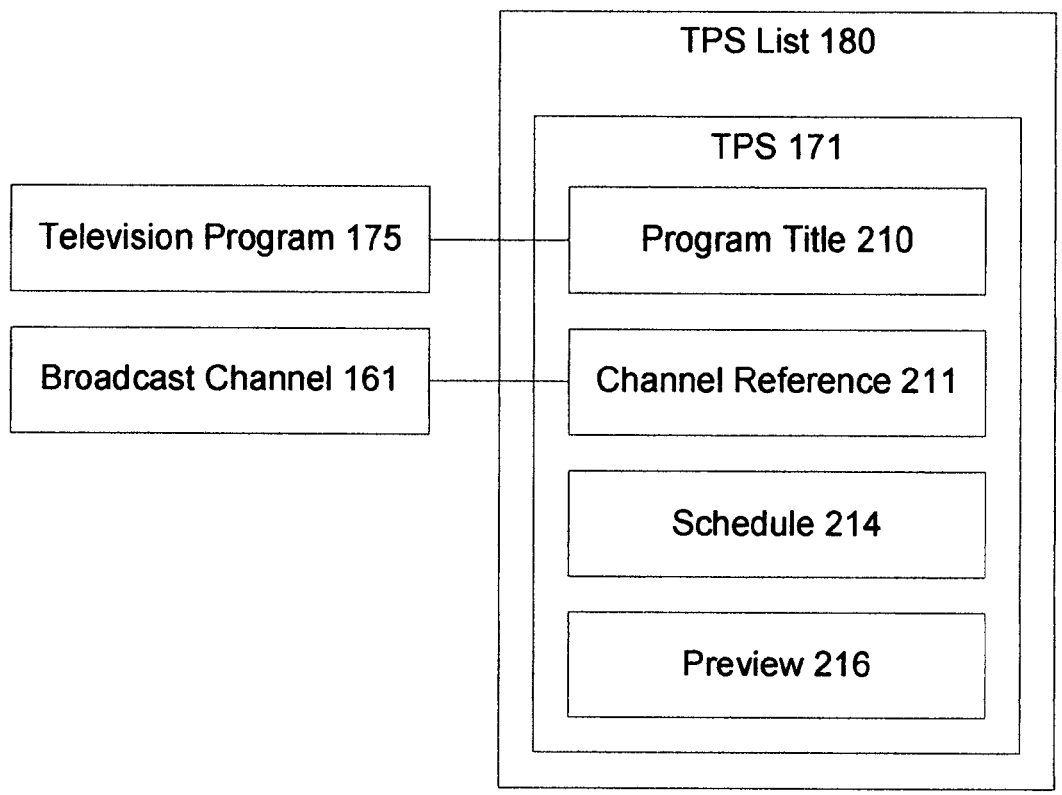
FIG. 2 is a schematic diagram illustrating a television program summary, in accordance with an embodiment of the present invention.

FIG. 2 illustrates an exemplary TPS. TPS list 180 includes TPS 171, which further includes information related to a television program 175 from broadcast channel 161, program title 210, channel reference 211, schedule 214, and, optionally, a preview 216. Program title 210 is a title of television program 175. Examples of program titles 210 includes a name, such as "CSI: Miami", "NFL Super Bowl XLII", "ER", or "Batman Returns".

Channel reference 211 references to broadcast channel 161. for example, channel reference 211 may include a URL format such as tv://OTA/channel/34 indicating broadcast channel 161 being off-the-air channel number 34, or tv://cable/channel/7 indicating cable channel number 7. Other examples include sub-channels, such as tv://channel/7.4 indicating sub-channel 4 of channel 7. In another example, channel reference 211 may include a name such as "espn" indicating broadcast channel 161 having a channel name "espn", or a number such as "38" indicating broadcast channel 161 having a channel number "38".

Schedule 214 references a time/date when television program 175 is to be shown on broadcast channel 161. For example, schedule 214 includes a date and starting time. In another example, schedule 214 includes an ending time, or duration of television program 175. In another example, television program 175 is a television series, and schedule 214 includes a plurality of times. In yet another example, schedule 214 includes a daily, weekly or monthly schedule for television program 175.

Preview 216 includes image and sound signals. For example, preview 216 may include a video file such as a Moving Pictures Expert Group v4.0 (MPEG-4) file, an Audio Video Interleave (AVI) file, a Flash Video (FLV) file, or a Quicktime MOV file. In one embodiment, preview 216 includes a video stream such as an MPEG-2 stream, MPEG-1 stream, or H.264/MPEG-4 AVC stream. In another embodiment, preview 216 includes an Advanced Stream Redirector (ASX) metafile.

In various embodiments, TPS 171 may include additional information, such as television program rating, user review, content classification, casts, or a score of a sport event, individually or in combination. Additional information may also include a monetary amount or token amount for viewing the television program.

Figure 3:
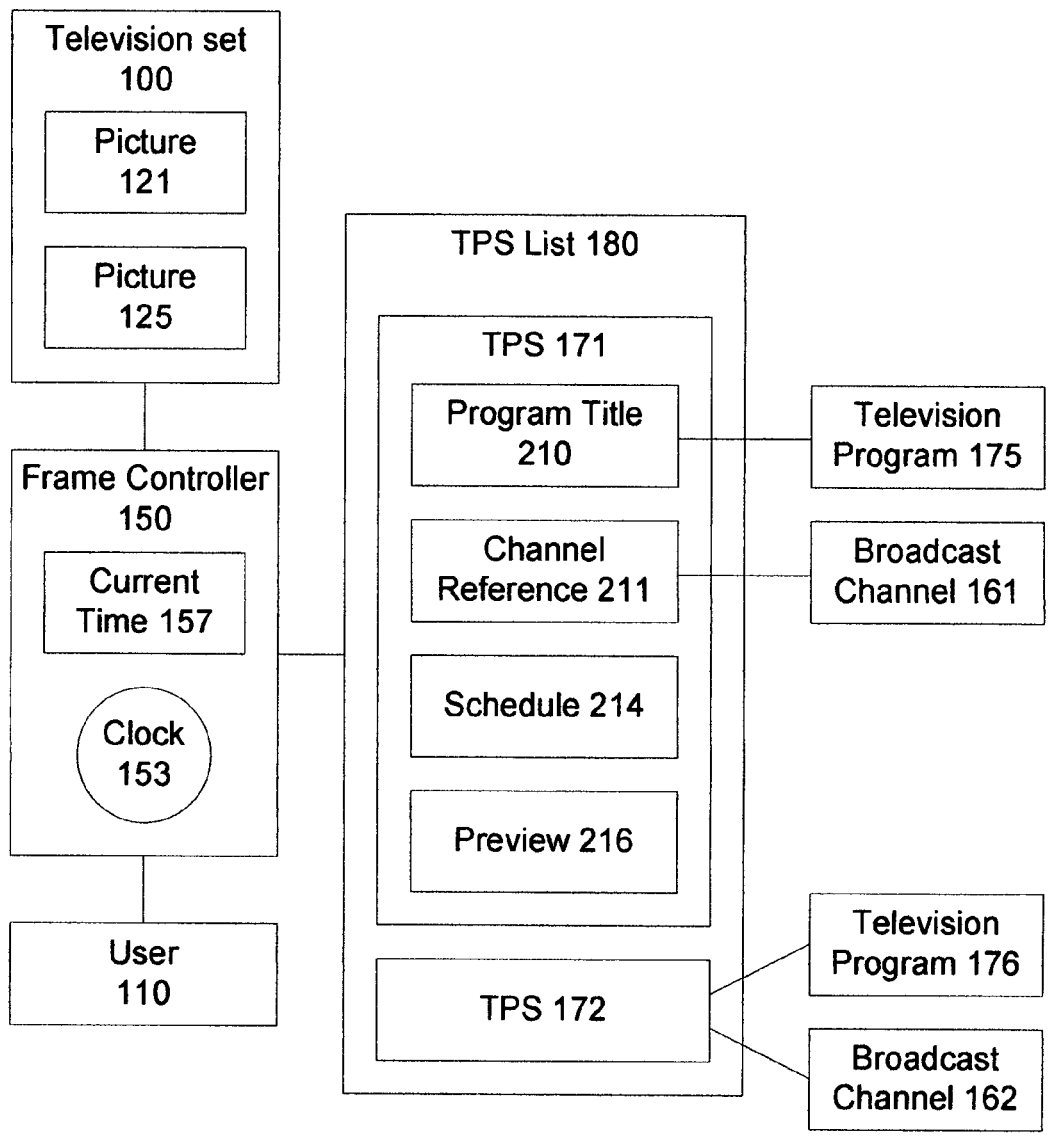
FIG. 3 is a schematic diagram illustrating television program summary processing, in accordance with an embodiment of the present invention.

FIG. 3 illustrates exemplary processing of a TPS. In operation, frame controller 150 receives TPS 171 from TPS channel 165, and displays TPS 171 onto picture 125. For example, frame controller 150 receives image and sound signals of preview 216 and displays the signals onto picture 125. In another example, frame controller 150 displays schedule 214 onto picture 125. Additionally, frame controller 150 may display program title 210 and channel reference 211 onto picture 125, and perhaps the additional information of TPS 171 as well.

In an embodiment of the invention, TPS list 180 includes a second TPS 172, which may also be displayed by the frame controller 150.

In an embodiment of the invention, frame controller 150 determines broadcast channel 161 for picture 121, based on TSP list 180. For example, frame controller 150 selects TPS 171, and processes channel reference 211 to determine displaying broadcast channel 161.

Alternatively, frame controller 150 connects to user 110, using an input interface module such as a pointing device, a remote control, an electronic programming guide, or a button. Frame controller 150 then displays TPS 171 as a user selectable object in picture 125, and user 110 selects TPS 171 from picture 125. Frame controller 150 selects TPS 171, based on selection of user 110, to determine displaying broadcast channel 161.

In one embodiment, frame controller 150 includes a clock 153. Frame controller 150 obtains current time 157 from clock 153. Frame controller 150 compares current time 157 with schedule 214 of TPS 171 and determines current time 157 is within schedule 214. Frame controller 150 selects TPS 171.

In an embodiment of the invention, TPS list 180 includes TPS 172. TPS 171 follows TPS 172 in TPS list 180. TPS 172 relates to television program 176 from broadcast channel 162. Frame controller 150 displays television program 176 from broadcast channel 162. In one embodiment, frame controller 150 tracks broadcast channel 162 and determines when television program 176 ends. Frame controller 150 selects TPS 171 to determine broadcast channel 161 for picture 121. In operation, frame controller 150 determines that current time 157 exceeds or equals to the end time of the schedule of TPS 172, and then selects TPS 171 for display.

Figure 4:
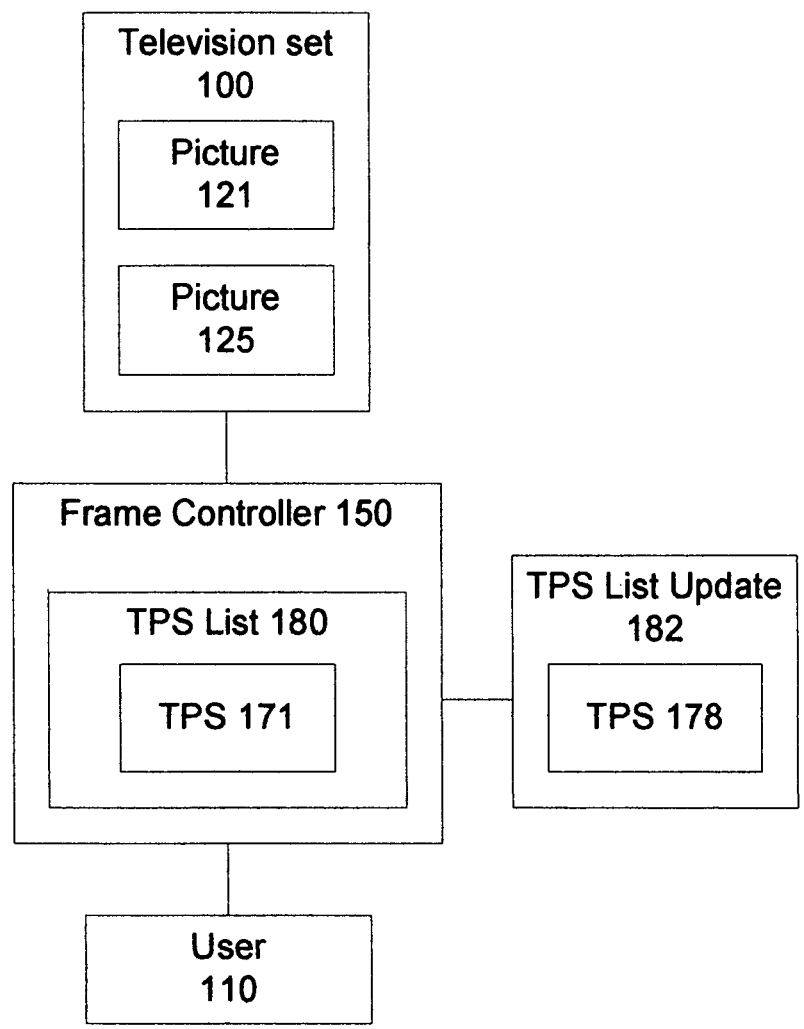
FIG. 4 is a schematic diagram illustrating a process for receiving a television programming summary update, in accordance with an embodiment of the present invention.

FIG. 4 illustrates an exemplary process to receive a television programming summary update. In operation, after frame controller 150 receives TPS 180 from TPS channel 165, frame controller 150 further receives TPS list update 182 from TPS channel 165. Frame controller 150 may receive a TPS list update 182 regularly after a pre-determined period of time, or periodically. In one example, frame controller 150 receives a TPS list update 182 when TPS list update 182 is made available on TPS channel 165. In another, frame controller 150 sends an update request to network computer 120, and receives TPS list update 182 based on the update request.

Once the TPS list update 182 is received, the frame controller 150 modifies TPS list 180 with the TPS list update 182. In one embodiment, frame controller 150 replaces TPS list 180 with TPS list update 182. In another embodiment, TPS list update 182 includes TPS 178, and the frame controller 150 adds TPS 178 into TPS list 180. In one embodiment, TPS 178 has the same program title 210 as TPS 171, and frame controller 150 replaces TPS 171 by TPS 178. In another embodiment, TPS list update 182 includes a removal instruction in TPS 178, and frame controller 150 removes TPS 171 from TPS list 180. In one embodiment, TPS 178 includes additional information relating television program 175, and frame controller 150 combines the additional information in TPS 178 into TPS 171.

After modifying the TPS list 180, the frame controller 150 displays the modified TPS list 180 onto picture 125. In one embodiment, frame controller 150 updates picture 121 by selecting broadcast channel 162 based on the modified TPS list 180, according to the process in FIG. 3. In another embodiment, broadcast channel 162 is different from broadcast channel 161, and frame controller 150 displays broadcast channel 162 onto picture 121.

In an embodiment of the invention, TPS channel 165 provides a television program guide for broadcast channel 161, wherein TPS list 180 is a daily, weekly or monthly program guide. TPS list 180 includes information relating to a plurality of television programs to be shown on broadcast channel 161. TPS channel 165 updates TPS list 180 regularly, for example hourly, daily, weekly or monthly. In one embodiment, TPS channel 165 updates TPS list 180 whenever there is a change in television program scheduling.

In one embodiment, TPS channel 165 provides a program guide for a televised event, such as the Olympics, an NFL sport program for 2008, or televised movies for the coming week.

In an embodiment of the invention, TPS list 180 comprises a plurality of programs TPS related to a common theme. For example, the theme may be related to an ethnic group, such as Japanese, French, or Spanish. In another example, the theme may be related to an age group, such as kids, teens, or adults. In another example, the theme may be related to a gender, like female or male. In another example, the theme may be related to an activity, such as cooking or home repair. In yet another example, the theme may be related to current events, such as the weather or news. In a last example, preview 216 of TPS 171 may include a summary of weather conditions, and broadcast channel 161 may be a weather channel.

In an embodiment of the invention, additional information of TPS 171 includes user comment or criticism of television program 175, and frame controller 150 displays the user comment/criticism on picture 125. In a further embodiment, after viewing television program 175, the consumer 110 may provide comment/criticism about television program 175 to frame controller 150, which then sends the consumer comment/criticism to network computer 120.

Additional information of TPS 171 may also include demographic and/or popularity information for television program 175. Frame controller 150 displays the demographic information/popularity information on picture 125, and consumer 110 selects TPS 171 based on the displayed information. In an embodiment, after consumer 110 selects TPS 171, frame controller 150 sends the selection of TPS 171 to network computer 120.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A television system comprising:
a frame controller configured to:
receive a video stream of a first television program comprising video data from a broadcast signal source;
receive a television program summary list comprising television program data from an Internet signal source, the television program data comprising a first schedule for the first television program from a first channel and a second schedule for a second television program from a second channel, the first schedule comprising an end time for the first television program; and communicate with a television display comprising a first picture and a second picture;

display the first television program in the first picture, wherein said video data comprises broadcast video data that is presented at a date and a time determined by a provider;

display the television program summary list in the second picture, wherein said television program data comprises Internet video data that is presented at a date and a time determined by a user and the first schedule for the first television program, wherein said first and second pictures are displayed concurrently;

while displaying the television program and the television program summary in the first and second pictures, send an update request to the Internet signal source over a data network connection;

receive from the Internet signal source a television program summary list update based on the update request, the television program summary list update comprising an updated first schedule for the first television program, the updated first schedule comprising an updated end time being before the end time for the first television program;

modify the television program summary list with the updated first schedule for the first television program; and track the first television program displayed in the first picture, comprising:
  determine that the current time is not before the updated end time for the first television program; and
  receive and display video data of the second television program from the second channel in the first picture concurrently with the modified television program summary list displayed in the second picture.

2. The television system according to claim 1, wherein the television program data comprises: a first program title, a first channel reference, and the first schedule of the first television program; and a second program title, a second channel reference, and the second schedule of the second television program.

3. The television system according to claim 2, wherein the first channel reference or the second channel reference comprises a URL.

4. The television system according to claim 1, wherein the video stream relates to an image and sound signal from a multi-channel operator.

5. The television system according to claim 1, wherein the video stream relates to an image and sound signal from a multi-service operator.

6. The television system according to claim 1, wherein the video stream relates to one of an online Internet television portal, a satellite television network, a cable television network, or a broadcast television network.

7. The television system according to claim 1, wherein the television program summary list comprises television program data for a plurality of television programs having a common theme.

8. The television system according to claim 1, wherein the frame controller further receives a comment from a consumer related to the first television program.

9. The television system according to claim 8, wherein the television program data further comprises consumer comments regarding the first television program.

10. The television system according to claim 1, wherein the television program summary list update further comprises an updated second schedule comprising an updated starting time for the second television program, wherein in tracking the first television program displayed in the first picture, the frame controller is further configured to:
  determine that the current time matches the updated starting time of the second television program;
  receive broadcast video data from the broadcast signal source, based on a channel reference for the second television program; and
  display the received broadcast video data in the first picture concurrently with the display of the modified television program summary list in the second picture.

11. The television system according to claim 1, wherein the video stream relates to an online Internet television portal.

12. The television system according to claim 1, wherein the television program summary list update comprise a removal instruction for the first television program, wherein the modifying of the television program summary list with the updated first schedule for the first television program comprises:
  remove the first television program from the television program summary list in response to the removal instruction.

13. The television system according to claim 1, wherein the television program summary list includes a first television program summary for the first television program comprising a program title, wherein the television program summary list update includes a second television program summary comprising the program title, wherein the modifying of the television program summary list with the update first schedule for the first television program comprises:
  determine that the program title in the second television program summary matches the program title in the first television program summary; and
  replace the first television program summary with the second television program summary.

14. The television system of claim 1, wherein the frame controller is further configured to:
  send a second update request to the Internet signal source over the data network connection;
  receive from the Internet signal source a second television program summary list update based on the second update request, the second television program summary list update comprising a second updated first schedule for the first television program;
  modify the modified television program summary list with the second updated first schedule for the first television program; and
  track the first television program displayed in the first picture, comprising:
    determine that the current time is within the second updated first schedule for the first television program; and
    continue to display in the first picture the first television program from the first channel.

15. The television system of claim 14, wherein the modified television program list comprises user provided information, wherein the second television program summary list update further comprises modified user provided information, wherein the frame controller is further configured to:
  display the modified television program summary list with the modified user provided information;
  determine that the current time is within the second updated first schedule for the first television program and receive a user selection of the second television program from the modified television program summary list with the modified user provided information; and
  receive and display video data of the second television program from the second channel in the first picture concurrently with the modified television program summary list displayed in the second picture.

16. The television system of claim 15, wherein the user provided information comprises one or more of the following: a theme; ratings; user comments; an age group; content classification; and a channel reference.

17. A method for displaying Internet and broadcast video streams, the method comprising:
receiving, by a frame controller, a video stream of a first television program comprising video data from a broadcast signal source, the frame controller further in communication with a television display comprising a first picture and a second picture;
receiving, by the frame controller, a television program summary list comprising television program data from an Internet signal source, the television program data comprising a first schedule for the first television program from a first channel and a second schedule for a second television program from a second channel, the first schedule comprising an end time for the first television program,
displaying the first television program in the first picture, wherein said video data comprises broadcast video data that is presented at a date and a time determined by a provider;
displaying the television program summary list in the second picture, wherein said television program data comprises Internet video data that is presented at a date and a time determined by a user and the first schedule for the first television program, wherein the first and second pictures are displayed concurrently;
while displaying the first television program and the television program summary list in the first and second pictures, sending an update request to the Internet signal source over a data network connection;
receiving from the Internet signal source a television program summary list update based on the update request, the television program summary list update comprising an updated first schedule for the first television program, the updated first schedule comprising an updated end time being before the end time for the first television program;
modifying the television program summary list with the updated first schedule for the first television program; and
tracking the first television program displayed in the first picture, comprising:
determining that the current time is not before the updated end time for the first television program; and
receiving and displaying video data of the second television program from the second channel in the first picture concurrently with the modified television program summary list in the second picture.

18. The method according to claim 17, wherein the video stream relates to an image and sound signal from a multichannel operator.

19. The method according to claim 17, wherein the video stream relates to an image and sound signal from a multiservice operator.

20. The method according to claim 17, wherein the video stream relates to one of a satellite television network, a cable television network, or an online Internet television portal.

21. The method according to claim 17, wherein the television program data further comprises consumer comments regarding the first television program.

22. The method according to claim 17, wherein the television program summary list comprises television program data for one or more television programs having a common theme.

23. The method according to claim 17, wherein the video stream relates to an online Internet television portal.

24. The method according to claim 17, wherein the television program summary list update comprise a removal instruction for the first television program, wherein the modifying of the television program summary list with the updated first schedule for the first television program comprises:
in response to the removal instruction, removing the first television program from the television program summary list.

25. The method according to claim 17, wherein the television program summary list includes a first television program summary for the first television program comprising a program title, wherein the television program summary list update includes a second television program summary comprising the program title, wherein the modifying of the television program summary list with the update first schedule for the first television program comprises:
determining that the program title in the second television program summary matches the program title in the first television program summary; and
replacing the first television program summary with the second television program summary.

26. The method of claim 17, further comprising:
sending, by the frame controller, a second update request to the Internet signal source over the data network connection;
receiving from the Internet signal source a second television program summary list update based on the second update request, the second television program summary list update comprising a second updated first schedule for the first television program;
modifying the modified television program summary list with the second updated first schedule for the first television program; and
tracking the first television program displayed in the first picture, comprising:
determining that the current time is within the second updated first schedule for the first television program; and
continuing to display in the first picture the first television program from the first channel.

27. The method of claim 26, wherein the modified television program list comprises user provided information, wherein the second television program summary list update further comprises modified user provided information, wherein the tracking of the first television program displayed in the first picture comprises:
displaying the modified television program summary list with the modified user provided information;
determining that the current time is within the second updated first schedule for the first television program and receive a user selection of the second television program from the modified television program summary list with the modified user provided information; and
receiving and displaying video data of the second television program from the second channel in the first picture concurrently with the modified television program summary list displayed in the second picture.

28. The method of claim 27, wherein the user provided information comprises one or more of the following: a theme; ratings; user comments; an age group; content classification; and a channel reference.

* * * * *